(12) United States Patent
Lee et al.

(10) Patent No.: US 9,630,655 B1
(45) Date of Patent: Apr. 25, 2017

(54) GRILLE CARRIER

(71) Applicant: Ford Motor Company, Dearborn, MI (US)

(72) Inventors: Jeffery Lee, Tecumseh (CA); Joseph Andrew Hickey, Rochester, MI (US)

(73) Assignee: Ford Motor Copmany, Dearborn, MI (US)

( * ) Notice: Subject to any disclaimer, the term of this patent is extended or adjusted under 35 U.S.C. 154(b) by 36 days.

(21) Appl. No.: 14/950,229

(22) Filed: Nov. 24, 2015

(51) Int. Cl.
*B62D 25/08* (2006.01)

(52) U.S. Cl.
CPC .................. *B62D 25/085* (2013.01)

(58) Field of Classification Search
CPC ................................... B62D 25/085
USPC ...................................... 296/193.1
See application file for complete search history.

(56) References Cited

U.S. PATENT DOCUMENTS

| 7,252,312 B1 | 8/2007 | Shen et al. |
| 7,481,487 B2 | 1/2009 | Lau et al. |
| 7,896,409 B2 | 3/2011 | Abdelnour et al. |
| 8,157,303 B2 | 4/2012 | Fortin |
| 8,882,184 B2* | 11/2014 | Naito ................... B62D 25/085 |
| | | 296/203.02 |
| 9,016,772 B2* | 4/2015 | Townson ............. B62D 25/085 |
| | | 296/193.1 |
| 2007/0176441 A1 | 8/2007 | Lau et al. |
| 2007/0182173 A1 | 8/2007 | Shen et al. |
| 2011/0204680 A1 | 8/2011 | Fortin |
| 2015/0028605 A1 | 1/2015 | Maier et al. |
| 2016/0137230 A1* | 5/2016 | Taneda ................. B62D 25/085 |
| | | 296/193.09 |
| 2016/0280295 A1* | 9/2016 | Salamon ............. B62D 25/163 |
| 2016/0311472 A1* | 10/2016 | Lanard ................. B62D 25/084 |

* cited by examiner

*Primary Examiner* — Pinel Romain
(74) *Attorney, Agent, or Firm* — Damian Porcari; King & Schickli, PLLC

(57) ABSTRACT

A grille carrier for at least partially supporting a vehicle grille during installation is provided. The grille carrier includes a base, first and second walls extending from the base, and a top having an upper surface. The top is supported by a U-shaped support forming part of a stem attached to and extending from the base. The upper surface of the top includes a pair of projections for at least partially supporting the grille during installation. The projections are positioned at different distances away from a centerline each include a base and a head. The base is formed of four walls which are perpendicular to one another in one embodiment, and the head covers the base and forms a lip around its periphery. The lip prevents the partially supported grille from coming off during installation.

20 Claims, 9 Drawing Sheets

GRILLE CARRIER

TECHNICAL FIELD

This document relates generally to grille carriers, and more specifically to a grille carrier designed to partially support a grille during installation.

BACKGROUND

While the interiors of pickup trucks have become larger, more comfortable, and more sophisticated through the years, the exterior of the vehicle still plays a significant, if not dominant, role in the selection of a vehicle. One area of the vehicle exterior which has received substantial attention is the front grille. Through the years, whether on automobiles or trucks, the front grille has often been the centerpiece that grabs the attention of the observer resulting in grilles of increasing size.

While large grilles are presently desired by pickup truck enthusiasts, the larger grilles can present significant issues during installation within the manufacturing process. During installation it is important to center the grille between the headlamps. To do so, care must be given by the operator when positioning the grille on a grille carrier which has been previously mounted to the frame of the vehicle. While centering the grille seems a relatively straightforward task, the growing size of the grilles has added some complexity. Options for overcoming these complexities including utilizing more than one operator to install the grille or providing some sort of aid to the lone operator charged with mounting and centering the grille.

One type of aid provided to the operator is in the form of flexible locator tabs extending laterally from outboard sides of the grille. The locator tabs are designed to contact one of the headlamps in the event the grille is being installed off center, i.e., too close to one of the headlamps. The contact with the headlamp was intended to direct the grille away from the headlamp assembly with which contact was being made and back toward a more centered position. In this manner, one or the other locator tabs would provide assistance in locating the grille during installation and before the grille was secured to the grille carrier.

While the locator tabs have provided significant assistance in centering grilles during installation, the growing size of some grilles has diminished the ability of the locator tabs to provide suitable assistance. This is due primarily to the actions of the operators during the installation process. Given the size of the larger grilles, some operators have resorted to resting the grille on the grille carrier by engaging metal tabs or snaps positioned along a lower edge of the grille/grille carrier. Once engaged, however, the frictional force is sufficient to prevent the locator tabs from deflecting the grille toward the center when contact with the headlamps is made. This results in some grilles being installed in an undesirable position between the headlamp assemblies.

In other words, the grille is being initially positioned on the grille carrier in a manner that prevents any later lateral movement of the grille due to contact between the locator tabs and the headlamps. The result is that the grilles can be installed outside of the acceptable tolerances with regard to centering between the headlamps. Accordingly, a need exists for a grille carrier capable of eliminating the identified issues associated with centering the grille between headlamps during the installation process. Ideally, the grille carrier would support at least a portion of the weight of the grille during the installation process. This would eliminate the need to engage the metal tabs/snaps of the grille allowing the grille to move laterally for centering before being secured to the grille carrier. It would be most desirable if the lateral movement were the result of the centering tabs contacting the headlamp assemblies or the operator applying force during the installation process.

SUMMARY OF THE INVENTION

In accordance with the purposes and benefits described herein, a grille carrier includes a base having first and second ends, a first wall attached to and extending from the first end of the base, a second wall attached to and extending from the second end of the base, a top having first and second connected portions, each of the first and second connected portions having first and second ends and an upper surface, and a stem having a first end attached to and extending from the base and a second end attached to a U-shaped support, the U-shaped support having first and second upwardly extending arms, wherein a first end of the first connected portion of the top is supported by and connected to a second end of the first wall and a second end of the first connected portion of the top is supported by and connected to the first upwardly extending arm of the U-shaped support, a first end of the second connected portion of the top is supported by and connected to a second end of the second wall and a second end of the second connected portion of the top is supported by and connected to the second upwardly extending arm of the U-shaped support, and the upper surface of the first connected portion and the upper surface of the second connected portion each include a projection for at least partially supporting a grille during installation.

In one possible embodiment, at least the base, the first and second walls, the top, and the stem are integrally molded.

In another possible embodiment, the second wall includes upper and lower portions and the upper portion is at least partially offset from the lower portion. In still another possible embodiment, the lower portion of the second wall includes a tab extending toward the stem, the tab supporting the upper portion of the second wall. In yet another, the first wall includes upper and lower portions, and further includes a first corner brace extending between the lower portion of the first wall and the first connected portion and a second corner brace extending between the tab of the lower portion of the second wall and the second connected portion.

In still yet another possible embodiment, the grille carrier further includes third and fourth corner braces, the third and fourth corner braces extending from the base to opposing sides of the stem.

In one other possible embodiment, the projection of the first connected portion is a first distance away from the first upwardly extending arm of the U-shaped support and the projection of the second connected portion is a second distance away from the second upwardly extending arm of the U-shaped support, and wherein the second distance is greater than the first distance. In another possible embodiment, the first and second projections each include a base and a head, the base including four walls. In another, the head covers the base and forms a lip around a periphery of the head.

In one alternate embodiment, a grille carrier includes a base having first and second ends, a flange extending downward from the base, a first wall attached to and extending from the first end of the base, a second wall attached to and extending from the second end of the base, a top having first and second connected portions, each of the first and second connected portions having first and second ends and an upper surface, and a stem having a first end attached to and extending from the base and a second end attached to a U-shaped support, the U-shaped support having first and second upwardly extending arms, wherein a first end of the first portion of the top is supported by and connected to a second end of the first wall and a second end of the first portion of the top is supported by and connected to the first upwardly extending arm of the U-shaped support, a first end of the second portion of the top is supported by and connected to a second end of the second wall and a second end of the second portion of the top is supported by and connected to the second upwardly extending arm of the U-shaped support, and the upper surface of the first connected portion and the upper surface of the second connected portion each include a projection for at least partially supporting a grille during installation.

In another possible embodiment, the flange includes a plurality of substantially rectangular apertures including a central aperture substantially centered below the stem.

In still another possible embodiment, the at least the base, the flange, the first and second walls, the top, and the stem are integrally molded.

In yet another possible embodiment, the projection of the first connected portion is a first distance away from the first upwardly extending arm of the U-shaped support and the projection of the second connected portion is a second distance away from the second upwardly extending arm of the U-shaped support, and wherein the second distance is greater than the first distance.

In still another alternate embodiment, a carrier for supporting a grille of a vehicle includes a base supporting upwardly extending walls adjacent ends of the base, a flange extending downward from the base, and a top attached to the upwardly extending walls adjacent ends of the top and to an upwardly extending stem supported by the base, wherein the top includes an upper surface including first and second projections on which the grille is supported during installation, the first projection extending from the upper surface a first distance away from the upwardly extending stem and the second projection extending from the upper surface a second distance away from the upwardly extending stem, and wherein the second distance is greater than the first distance.

In one other alternate embodiment, the at least the base, the upwardly extending walls, the flange, the top, and the upwardly extending stem are integrally molded, and wherein the flange includes seven substantially rectangular apertures.

In another possible embodiment, a central aperture of seven substantially rectangular apertures formed in a flange is centered below the stem, and the seven rectangular apertures are spaced a substantially equidistance apart.

In still one other possible embodiment, each of the first and second projections include a base and a head.

In the following description, there are shown and described several embodiments of a grille carrier for removing debris from a metal wire formed by a process utilizing a lubricant. As it should be realized, the devices and methods are capable of other, different embodiments and their several details are capable of modification in various, obvious aspects all without departing from the methods and assemblies as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the device and method and together with the description serve to explain certain principles thereof. In the drawing figures.

Reference will now be made in detail to the present preferred embodiments of the grille carrier, examples of which are illustrated in the accompanying drawing figures, wherein like numerals are used to represent like elements.

DETAILED DESCRIPTION

Figure 1:
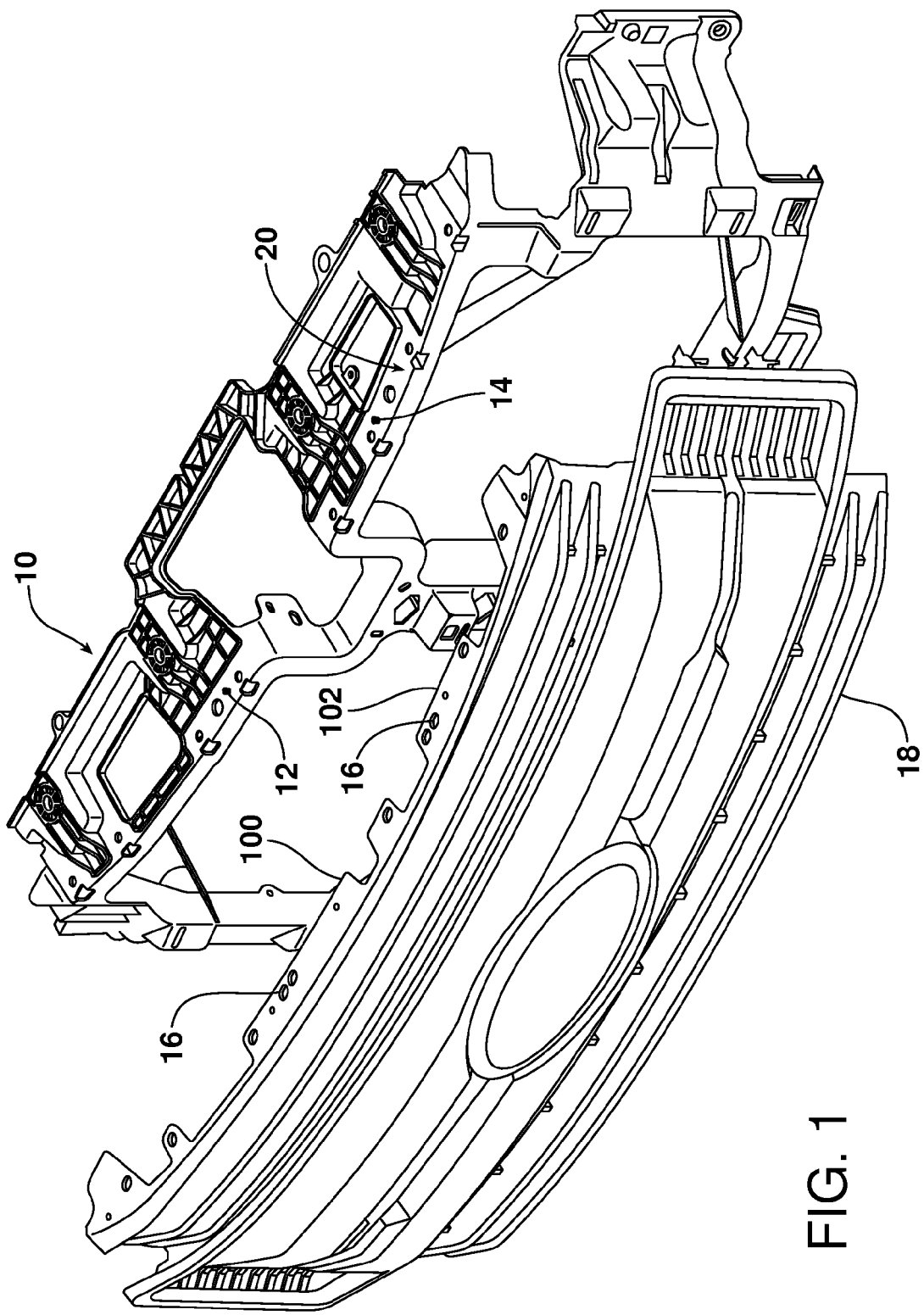
FIG. 1 is a is a perspective view of a grille carrier adjacent a grille of a vehicle.
Figure 2:
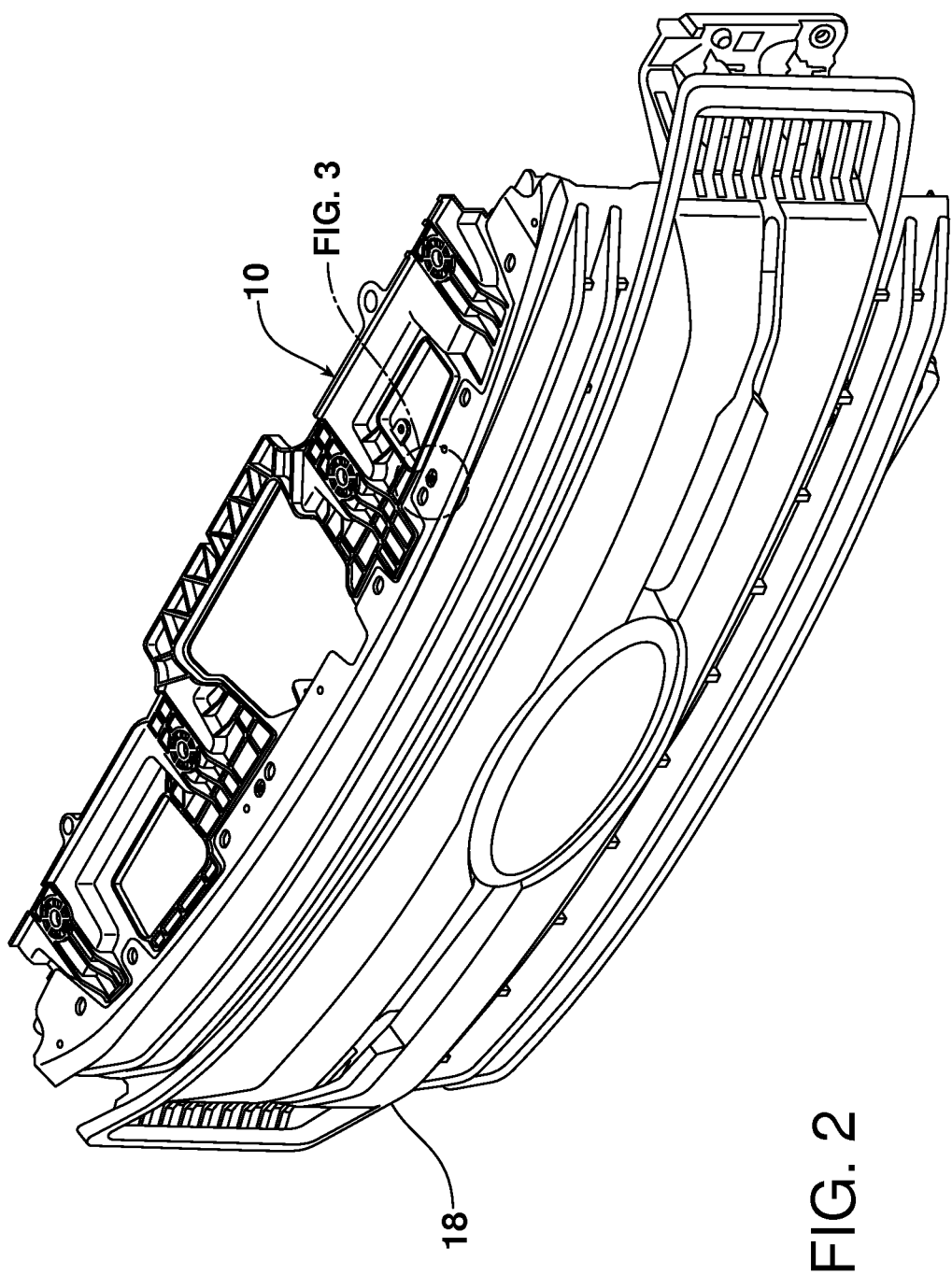
FIG. 2 is a is a perspective view of a grille mounted on a grille carrier.

Reference is now made to FIG. 1 which illustrates a grille carrier 10 for a vehicle. The described grille carrier 10 is an integrally molded unit and includes upwardly extending projections or tabs 12, 14. The projections 12, 14 are designed to receive apertures 16, generally in the shape of slots, formed in a grille 18 of a vehicle (not shown). The grille 18 is shown adjacent the grille carrier 10 in FIG. 1 and mounted on the grille carrier in FIG. 2.

During the installation process, the grille 18 and, more specifically, the grille apertures 16 are positioned over the projections 12, 14 and lowered onto an upper surface 20 of the grille carrier 10. In this manner, the upper surface 16 of the grille carrier 10 supports at least a portion of the weight of the grille. By supporting at least a portion of the weight of the grille 18 by essentially hanging the grille from the grille carrier projections 12, 14, a single operator can more readily align the grille 18 before securing the grille to the grille carrier 10. This hanging arrangement leaves a lower portion of the grille 18 free for movement (e.g., to swing away from the grille carrier 10 while being supported by the projections 12, 14 and for centering alignment on the vehicle).

Figure 3:
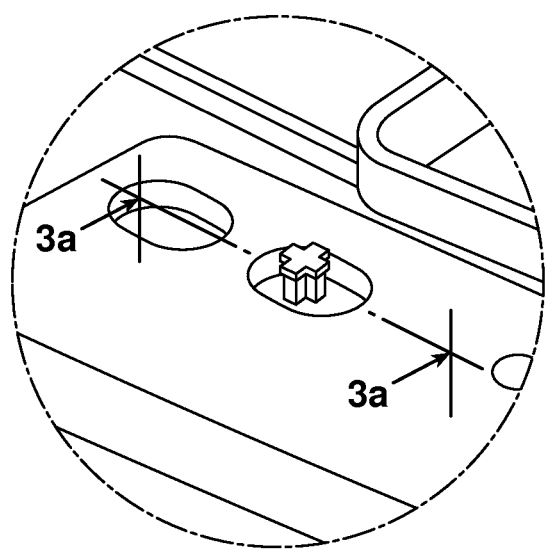
FIG. 3 is a perspective view of a projection extending from the grille carrier and through an aperture formed in the grille.
Figure 3A:
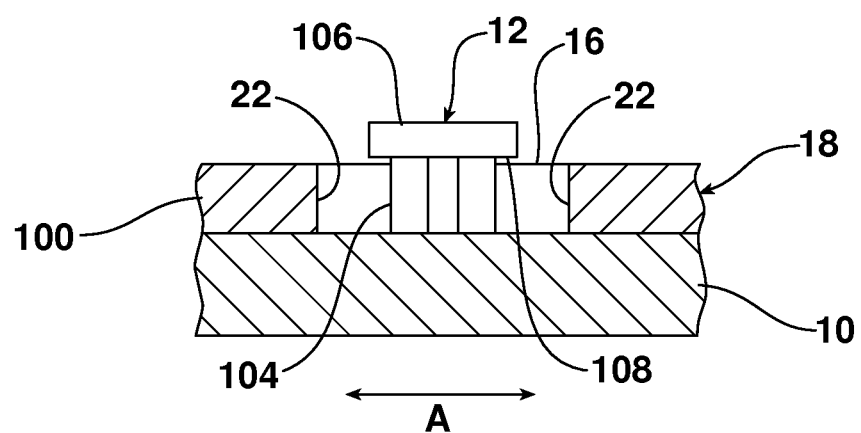
FIG. 3a is a sectional view of the projection extending from the grille carrier and through an aperture formed in the grille.

As shown in FIGS. 3 and 3a, the grille apertures 16 are formed as slots in the described embodiment. Accordingly, the grille 18 is free for movement in a lateral, i.e., a side to side or cross the vehicle, direction (shown by action arrow A) within the grille apertures 16. In other words, the shape of the grille apertures 16 allows the grille 18 to float cross vehicle within acceptable tolerances. The limits of the tolerances are established by ends 22 of the grille apertures 16. This freedom of movement is intended to allow the grille 18 to be centered on the grille carrier 10 between headlamps of the vehicle prior to fixing the grille to the grille carrier.

Even more, hanging or suspending the grille 18 by the projections 12, 14 on the grille carrier 10 allows locator tabs (not shown) which may extend from the grille 18 in alternate embodiments to function through contact with the headlamps which provides assistance in aligning the grille. Alternately, or in addition to the locator tabs, the operator may simply apply a suitable force to the grille 18 to move the grille to a central position on the grille carrier 10 utilizing the projections 12, 14 and grille apertures 16 to ensure that movement of the grille is within the acceptable tolerances. In other words, the slots 16 work in combination with the projections 12, 14 to ensure that the grille 18 is substantially centered on the grille carrier 10 during installation.

Figure 4:
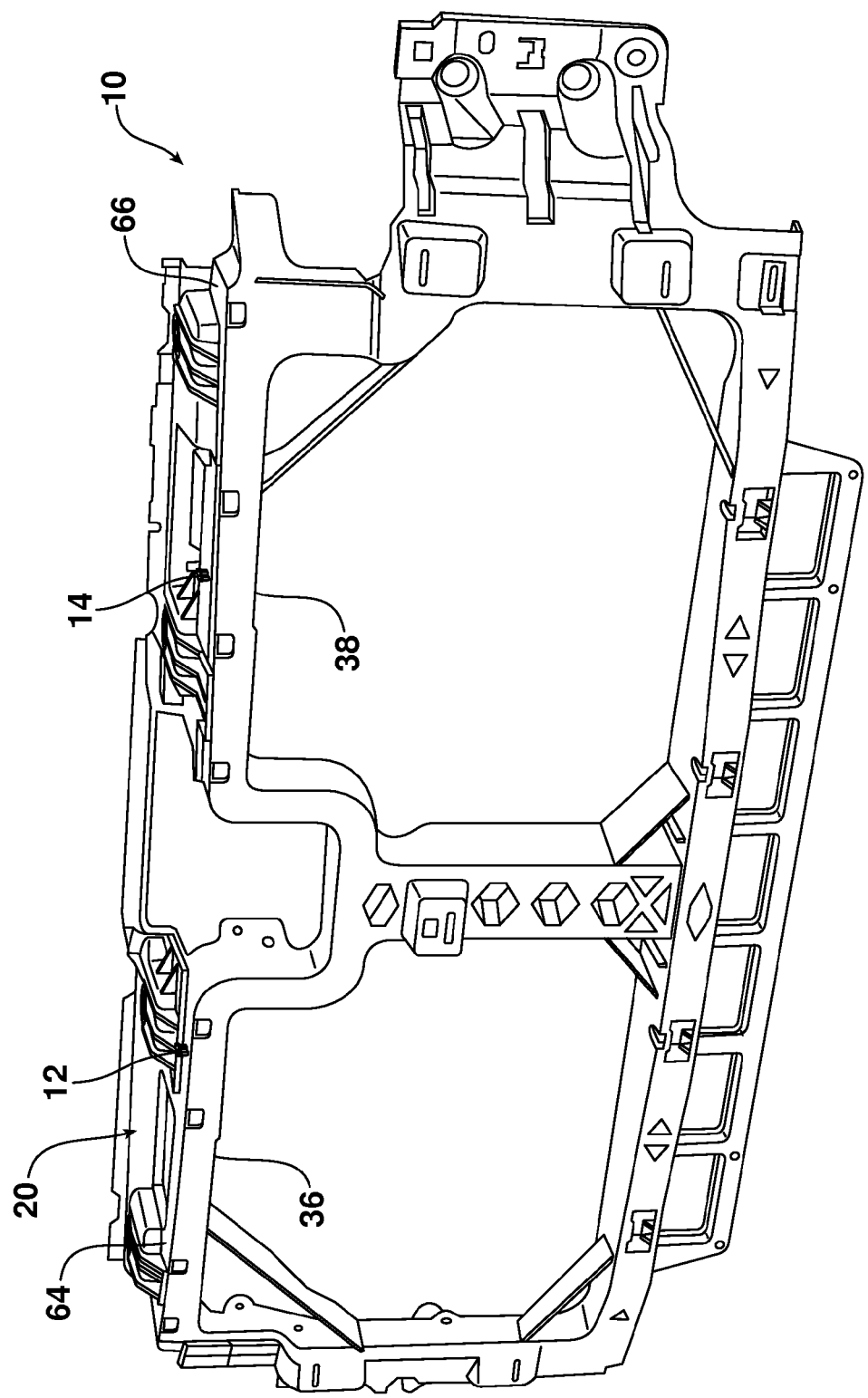
FIG. 4 is a is a perspective view of the grille carrier.
Figure 5:
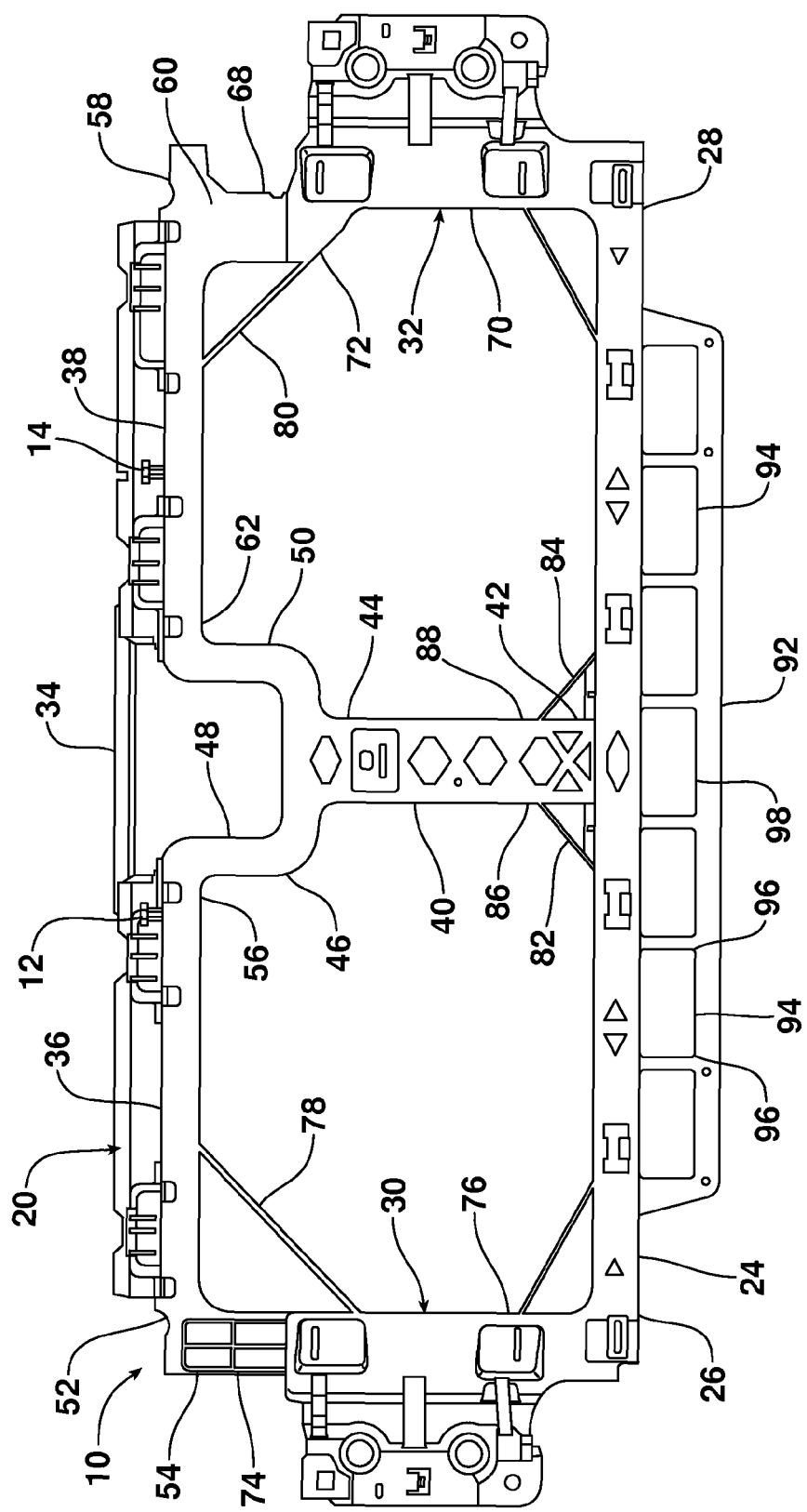
FIG. 5 is a front plan view of the grille carrier.

As shown in FIGS. 4 and 5, the grille carrier 10 further includes a base 24 having first and second ends 26, 28. A first wall 30 is attached to and extends from the first end 26 of the base 24. A second wall 32 is similarly attached to and extends from the second end 28 of the base 24. A top 34 includes first and second connected portions 36, 38. Each of the first and second connected portions 36, 38 includes first and second ends and an upper surface. A stem 40 includes a first end 42 attached to and extending from the base 24 and a second end 44 attached to a U-shaped support 46. The U-shaped support 46 includes first and second upwardly extending arms 48, 50.

A first end 52 of the first connected portion 36 of the top 34 is supported by and connected to a second end 54 of the first wall 30. Similarly, a second end 56 of the first connected portion 36 of the top 34 is supported by and connected to the first upwardly extending arm 48 of the U-shaped support 46. A first end 58 of the second connected portion 38 of the top 34 is supported by and connected to a second end 60 of the second wall 32. A second end 62 of the second connected portion 38 of the top 34 is supported by and connected to the second upwardly extending arm 50 of the U-shaped support 46.

As perhaps best shown in FIG. 4, the upper surface 20 of the grille carrier 10 includes an upper surface 64 of the first connected portion 36 and an upper surface 66 of the second connected portion 38. The first projection 12 is attached to and extends from the upper surface 64 of the first connected portion and the second projection 14 is similarly attached to and extends from the upper surface 66 of the second connected portion 38. As indicated above, in the described embodiment, the grille carrier 10 is integrally molded including the first and second projections 12. 14. Alternate embodiments may be fully or partially integrally molded, or otherwise.

As shown in FIG. 5, the second wall 32 in the described embodiment includes upper and lower portions 68, 70 with the upper portion being at least partially offset from the lower portion. A tab 72 extends from the lower portion 70 of the second wall 32 toward the stem 40. The tab 72 supports the upper portion 68 of the second wall 32. In a different manner, the first wall 30 includes upper and lower portions 74, 76. A first corner brace 78 extends between the lower portion 76 of the first wall 30 and the first connected portion 36 and a second corner brace 80 extends between the tab 72 and the second connected portion 38. Third and fourth corner braces 82, 84 extend from the base 24 to opposing sides 86, 88 of the stem 40.

Figure 6:
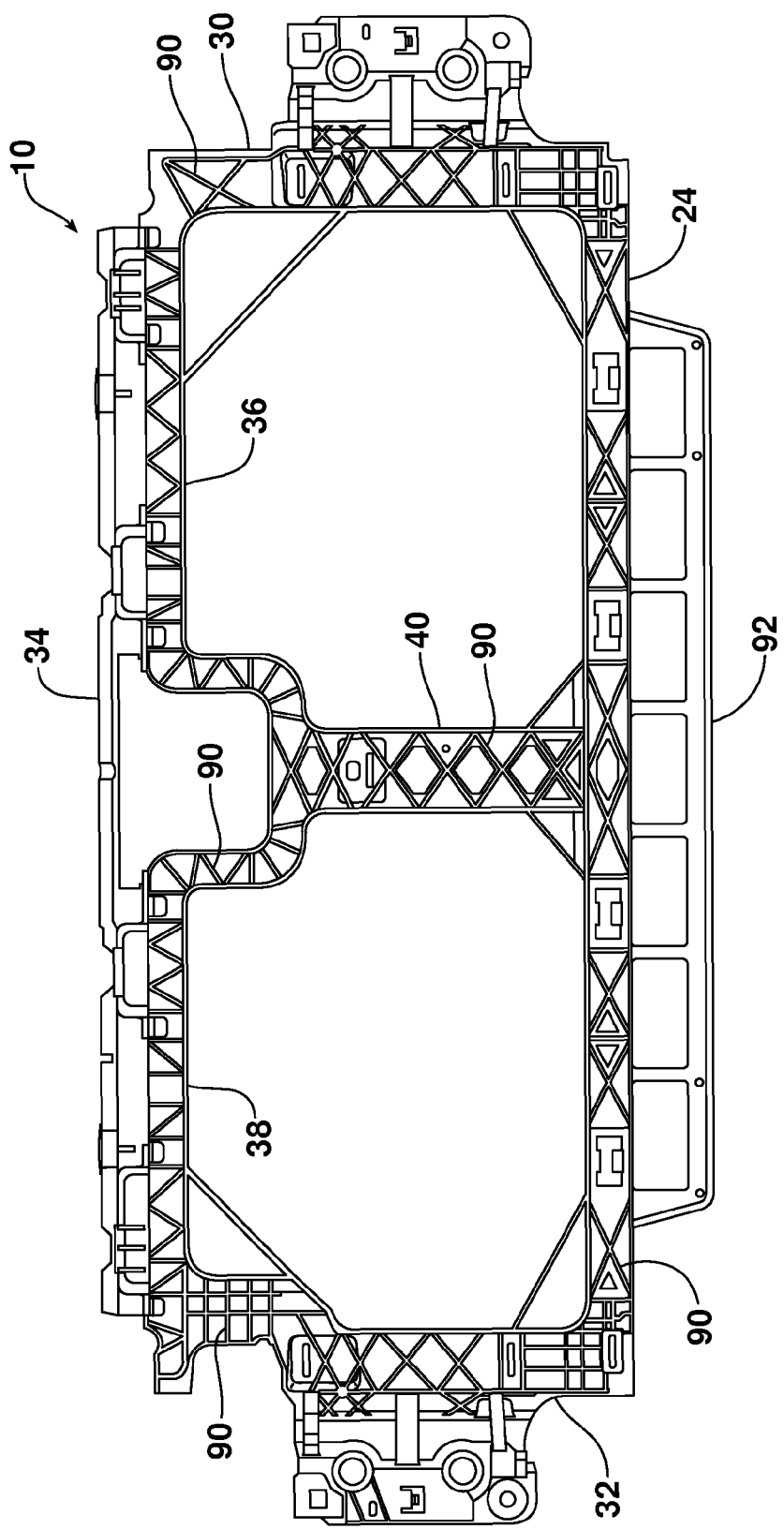
FIG. 6 is a rear plan view of the grille carrier.

As shown in FIG. 6, a rear of the grille carrier 10 includes a plurality of structural supports 90 positioned with the base 24, first and second walls 30, 32, stem 40, and the first and second upper connected portions 36, 38. The structural supports 90 are integrally molded with the grille carrier 10 and provide support for the base 24, first and second walls 30, 32, stem 40, and the first and second upper connected portions 36, 38.

As further shown in FIG. 6, and perhaps best shown in FIG. 5, a flange 92 extends from the base 24. In the described embodiment, the flange 92 extends downwardly and includes a plurality of substantially rectangular apertures 94. The plurality of apertures 94 are essentially rectangular in shape with radii 96 in each corner thereof. In the described embodiment, there are seven substantially rectangular apertures 94 including a central aperture 98 substantially centered below the stem 40. The seven substantially rectangular apertures 94 are spaced a substantially equidistance apart beginning from the central aperture 98 moving outward in either direction.

Figure 7:
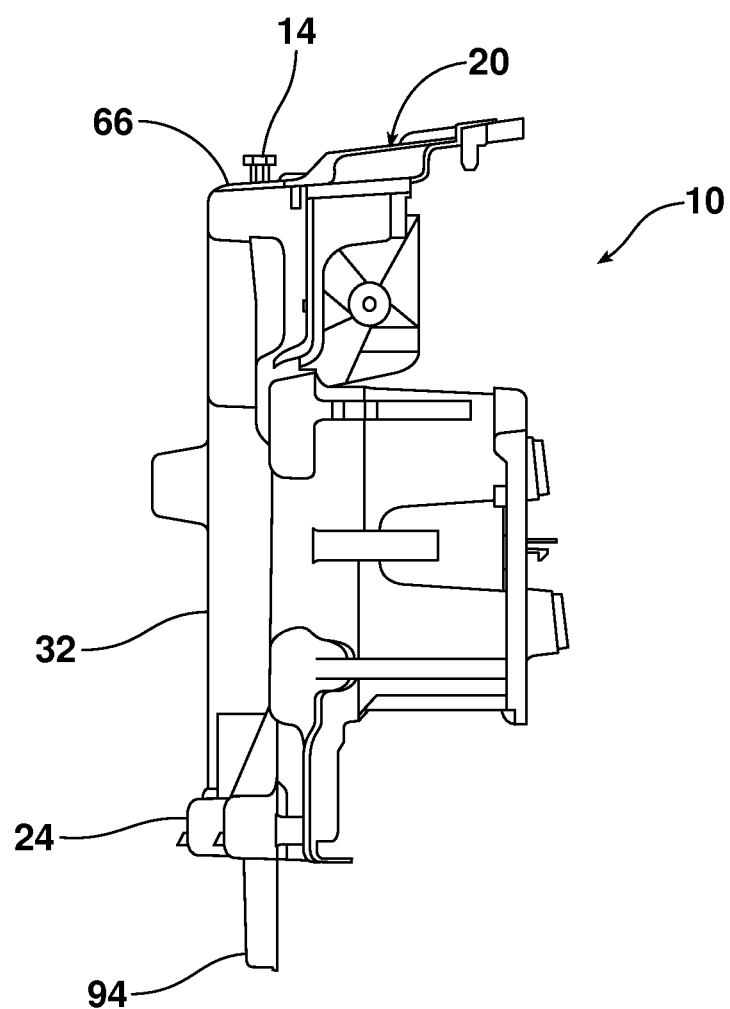
FIG. 7 is a side plan view of the grille carrier.

As shown in FIG. 7, the flange 94 extends downwardly from a rear portion of the base 24. As further shown, the upper surface 64 of the first connected portion 36 of the top 34 and the upper surface 66 of the second connected portion 38 are substantially flat. As described above, the first and second projections 12, 14 extend from the upper surfaces 64, 66 to support the grille 18 during installation. The absence of slope within the upper surfaces 64, 66 more readily accommodates flanges 100, 102 (shown in FIG. 1) extending from the grille 18 in which the slots 16 are formed. In this manner, slippage during the installation process when the grille 18 is hanging from the projections 14, 16 is minimized.

In the described embodiment, as shown in FIG. 5, the first and second projections 12, 14 are not positioned an equidistance from a centerline of the grille carrier 10. While the first and second projections 12, 14 are shown rather small in FIG. 5, FIGS. 8 and 9 which are both enlarged portions of the grille carrier 10 illustrating the first and second projections 12, 14, respectively, and portions of the grille carrier 10 further demonstrate this fact.

Figure 8:
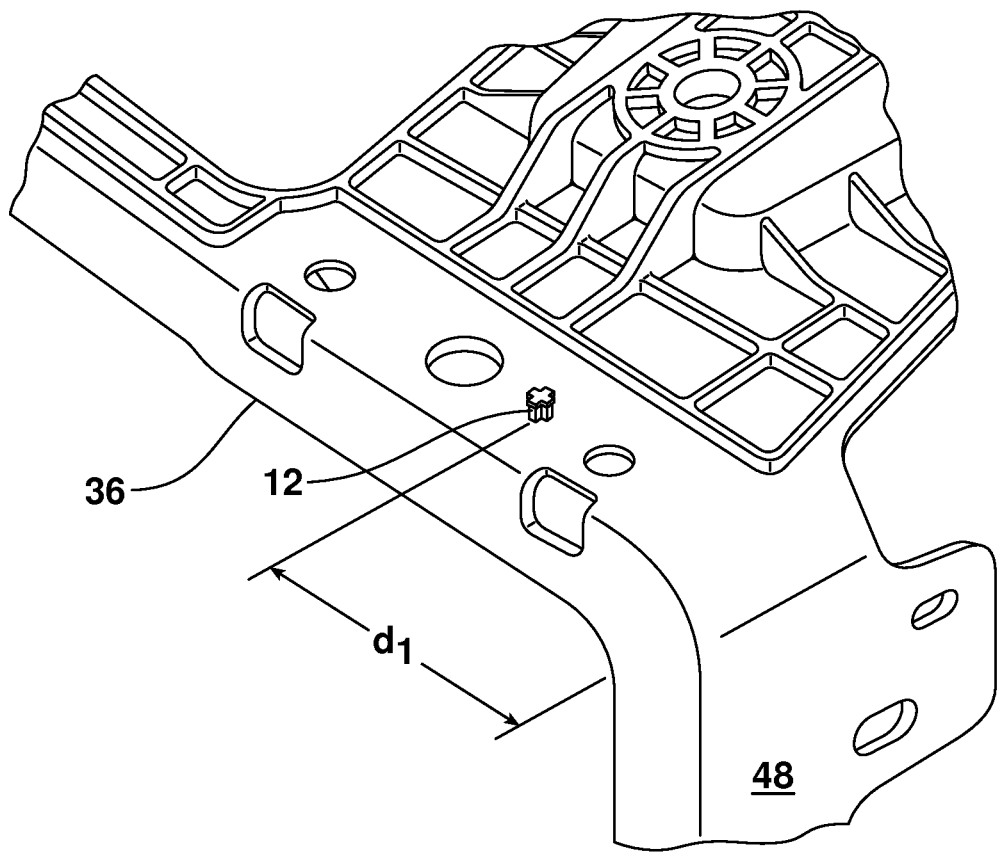
FIG. 8 is an enlarged perspective view of a portion of the griller carrier including the first projection.
Figure 9:
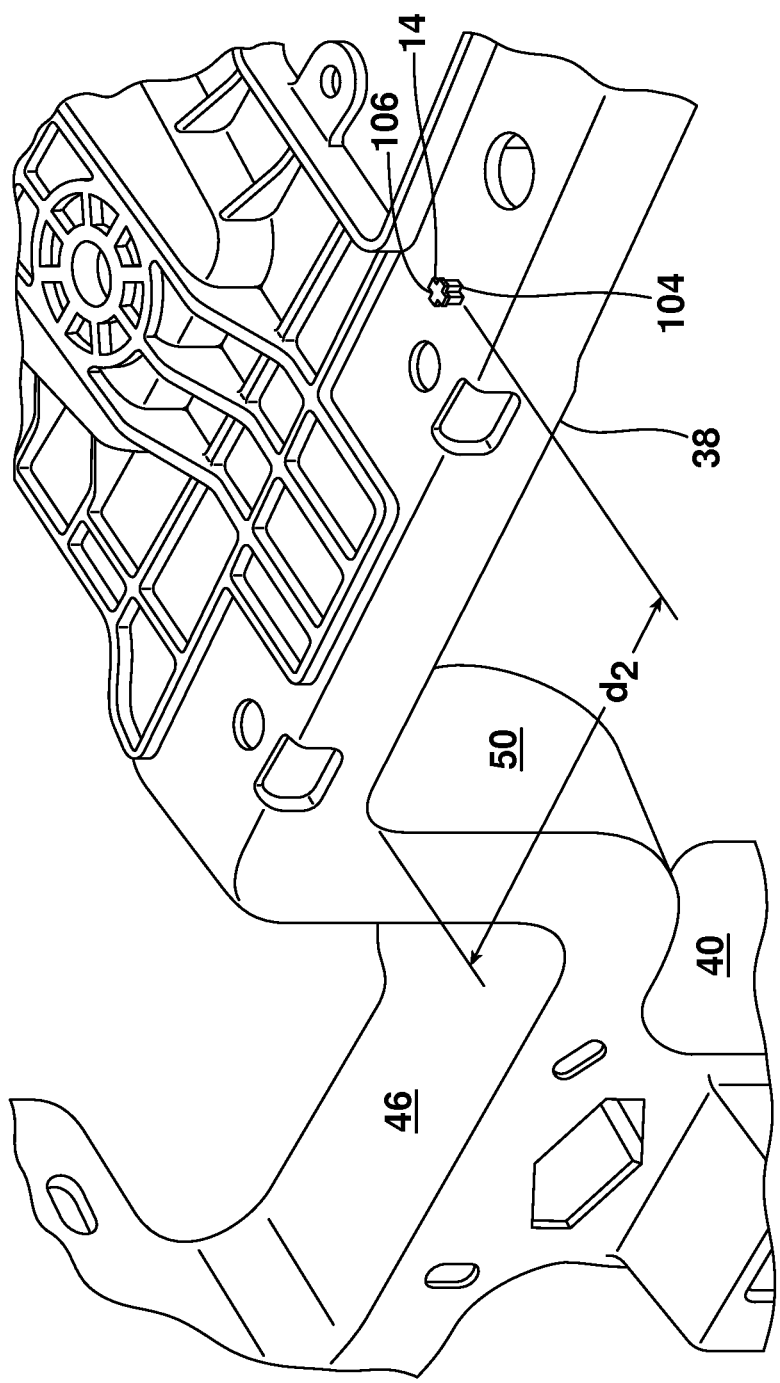
FIG. 9 is an enlarged perspective view of a portion of the griller carrier including the second projection.

In other words, the first projection 12 shown in FIG. 8 is a certain distance $d_1$ from an outer face of the first upwardly extending arm 48 of the substantially U-shaped support 46. Similarly, the second projection 14 shown in FIG. 9 is a certain distance $d_2$ from an outer face of the second upwardly extending arm 50 of the substantially U-shaped support 46. Although clearly depicted in the noted figures, the second distance, $d_2$, is greater than the first distance, $d_1$.

As further shown, the first and second projections 12, 14 are identical except for their respective locations on the grille carrier 10. As shown in FIG. 9, the second projection 14 includes a base 104 and a head 106. The base 104 and head 106 are integrally molded in the described embodiment as noted above. Even more, the base 104 is generally shaped like a plus sign and includes four walls extending from a central portion. The four walls are generally perpendicular to adjacent walls of the four walls forming the plus sign.

As best shown in FIG. 3, the head 106 is sufficiently large to cover the base 104, including the four walls, forming a lip 108 around a periphery of the head. The lip 108 helps prevent the grille 18 (more specifically, the apertures 16 formed in the grille flanges 100, 102) from slipping off of the grille carrier 10 and the first and second projections 12, 14 during the installation process. Once the grille 10 is positioned over the first and second projections 12, 14, the lips 108 of the projections provide substantial resistance against the edges of the apertures 16 in the grille 18 thereby limiting the potential for the grille 18 to slip off of the grille carrier 10 during installation.

In summary, numerous benefits resulting from the grille carrier having first and second projections to assist the installation of a grille on the grille carrier, are illustrated in this document. The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. A grille carrier, comprising:
   a base having first and second ends;
   a first wall attached to and extending from said first end of said base;
   a second wall attached to and extending from said second end of said base;
   a top having first and second connected portions, each of said first and second connected portions having first and second ends and an upper surface; and
   a stem having a first end attached to and extending from said base and a second end attached to a U-shaped support, said U-shaped support having first and second upwardly extending arms,
   wherein a first end of said first connected portion of said top is supported by and connected to a second end of said first wall and a second end of said first connected portion of said top is supported by and connected to said first upwardly extending arm of said U-shaped support, a first end of said second connected portion of said top is supported by and connected to a second end of said second wall and a second end of said second connected portion of said top is supported by and connected to said second upwardly extending arm of said U-shaped support, and said upper surface of said first connected portion and said upper surface of said second connected portion each include a projection for at least partially supporting a grille during installation.

2. The grille carrier of claim 1, wherein at least said base, said first and second walls, said top, and said stem are integrally molded.

3. The grille carrier of claim 1, wherein said second wall includes upper and lower portions and said upper portion is at least partially offset from said lower portion.

4. The grille carrier of claim 3, wherein said lower portion of said second wall includes a tab extending toward said stem, said tab supporting said upper portion of said second wall.

5. The grille carrier of claim 4, wherein said first wall includes upper and lower portions, and further comprising a first corner brace extending between said lower portion of said first wall and said first connected portion and a second corner brace extending between said tab of said lower portion of said second wall and said second connected portion.

6. The grille carrier of claim 5, further comprising third and fourth corner braces, said third and fourth corner braces extending from said base to opposing sides of said stem.

7. The grille carrier of claim 1, wherein said projection of said first connected portion is a first distance away from said first upwardly extending arm of said U-shaped support and said projection of said second connected portion is a second distance away from said second upwardly extending arm of said U-shaped support, and wherein the second distance is greater than the first distance.

8. The grille carrier of claim 1, wherein said first and second projections each include a base and a head, said base including four walls.

9. The grille carrier of claim 8, wherein said head covers said base and forms a lip around a periphery of said head.

10. A grille carrier, comprising:
    a base having first and second ends;
    a flange extending downward from said base;
    a first wall attached to and extending from said first end of said base;
    a second wall attached to and extending from said second end of said base;
    a top having first and second connected portions, each of said first and second connected portions having first and second ends and an upper surface; and
    a stem having a first end attached to and extending from said base and a second end attached to a U-shaped support, said U-shaped support having first and second upwardly extending arms,
    wherein a first end of said first portion of said top is supported by and connected to a second end of said first wall and a second end of said first portion of said top is supported by and connected to said first upwardly extending arm of said U-shaped support, a first end of said second portion of said top is supported by and connected to a second end of said second wall and a second end of said second portion of said top is supported by and connected to said second upwardly extending arm of said U-shaped support, and said upper surface of said first connected portion and said upper surface of said second connected portion each include a projection for at least partially supporting a grille during installation.

11. The grille carrier of claim 10, wherein said flange includes a plurality of substantially rectangular apertures including a central aperture substantially centered below said stem.

12. The grille carrier of claim 11, wherein at least said base, said flange, said first and second walls, said top, and said stem are integrally molded.

13. The grille carrier of claim 12, wherein said projection of said first connected portion is a first distance away from said first upwardly extending arm of said U-shaped support and said projection of said second connected portion is a second distance away from said second upwardly extending arm of said U-shaped support, and wherein the second distance is greater than the first distance.

14. The grille carrier of claim 10, wherein each of said projections include a base and a head.

15. The grille carrier of claim 14, wherein said head covers said base and forms a lip around a periphery of said head.

16. The grille carrier of claim 15, wherein at least said base, said flange, said first and second walls, said top, said projections, and said stem are integrally molded.

17. A carrier for supporting a grille of a vehicle, comprising:
    a base supporting upwardly extending walls adjacent ends of said base;
    a flange extending downward from said base; and
    a top attached to said upwardly extending walls adjacent ends of said top and to an upwardly extending stem supported by said base;
    wherein said top includes an upper surface including first and second projections on which said grille is supported during installation, said first projection extending from said upper surface a first distance away from said upwardly extending stem and said second projection extending from said upper surface a second distance away from said upwardly extending stem, and wherein the second distance is greater than the first distance.

18. The grille carrier of claim 17, wherein at least said base, said upwardly extending walls, said flange, said top, and said upwardly extending stem are integrally molded, and wherein said flange includes seven substantially rectangular apertures.

19. The grille carrier of claim 18, wherein a central aperture of seven substantially rectangular apertures formed in a flange is centered below said stem, and said seven rectangular apertures are spaced a substantially equidistance apart.

20. The grille carrier of claim 17, wherein each of said first and second projections include a base and a head.

* * * * *